April 17, 1962 J. TUDGE 3,030,530
ELECTRICAL TURBO GENERATORS
Filed May 2, 1958 4 Sheets-Sheet 4

United States Patent Office 3,030,530
Patented Apr. 17, 1962

3,030,530
ELECTRICAL TURBO GENERATORS
Joseph Tudge, Walkden, Manchester, England, assignor to Metropolitan-Vickers Electrical Company Limited, London, England, a British company
Filed May 2, 1958, Ser. No. 732,658
Claims priority, application Great Britain May 3, 1957
2 Claims. (Cl. 310—55)

This invention relates to electrical turbo generators. One of the limitations in the design of very large turbo generators is the temperature rise of the copper conductors.

Air cooling of the rotor conductors has already been carried out by blowing air through passages formed in the conductors and similar air cooling through passages in the stator conductors has also been carried out.

It will be appreciated that whilst in the case of a rotor, gas cooling is probably the only practical form owing to other considerations such as windage, and connections to moving parts, these limitations do not arise in the case of a stator but at the same time owing to the voltages involved, electrical insulation becomes of importance.

According to the present invention an electrical turbo generator has a stator winding comprising a plurality of hollow conductors, means for circulating water through said hollow conductors between manifolds located at each end of the generator, said means comprising insulating tubing connectors at each end of the stator slots connecting the conductor passages with the manifold at that end of the machine and the arrangement being such that all the conductor passages of each slot bar are coupled to the same connector so that the water through a connector flows in parallel through all the conductor passages of a slot bar.

It will be appreciated that water has appreciably better heat transfer properties than air or other gases and hence a far higher degree of cooling is possible in this way.

Furthermore, the water, provided it is reasonably free from impurities, will have adequate electrical insulating properties.

Preferably the manifolds are insulated from the machine frame and they may be split into separate insulating manifolds for each phase of the winding. The insulating connectors are of an inert water impervious material, such for instance as polytetrafluoroethylene.

According to a further feature the connections to the stator terminals and the terminals themselves are constructed of hollow conductors and water cooled in a similar manner.

In order that the invention may be more fully understood reference will now be made to the accompanying drawings, in which.

Figure 1:
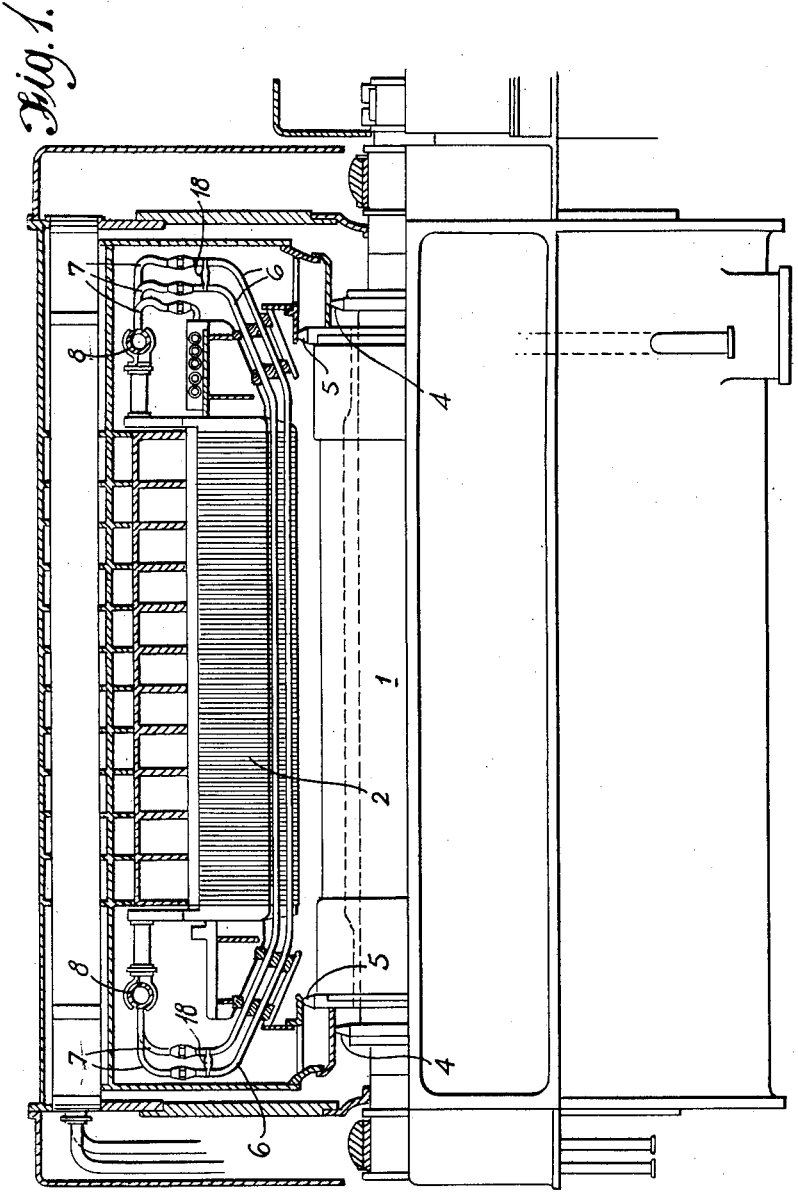
FIG. 1 is a longitudinal section of a machine embodying the invention.
Figure 2:
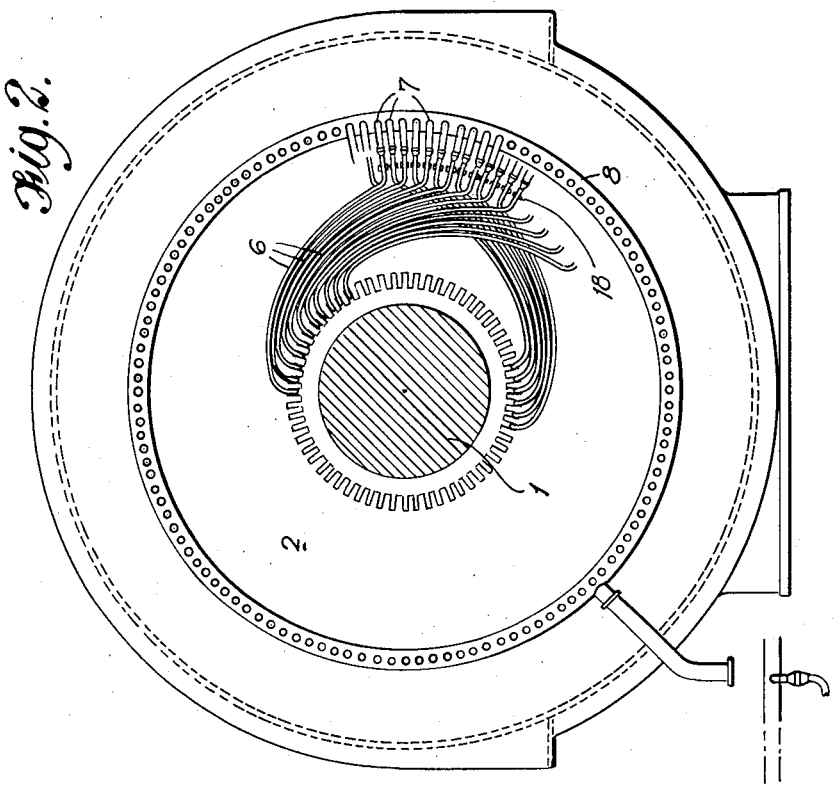
FIG. 2 is an end view.
Figure 4:
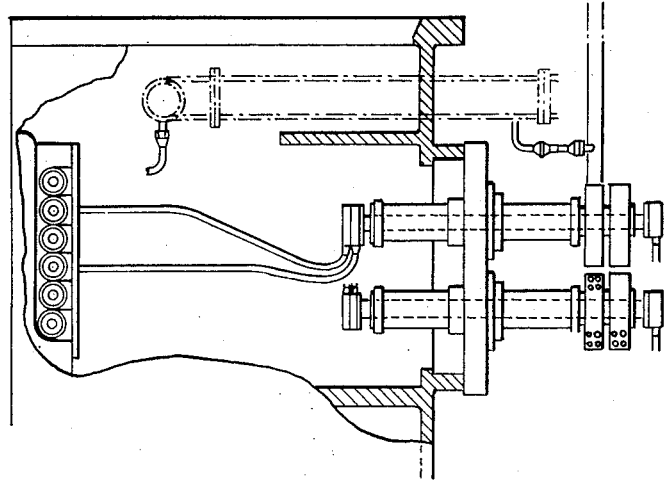
FIG. 4 is a detail view showing the cooling of the stator terminals.
Figure 3:
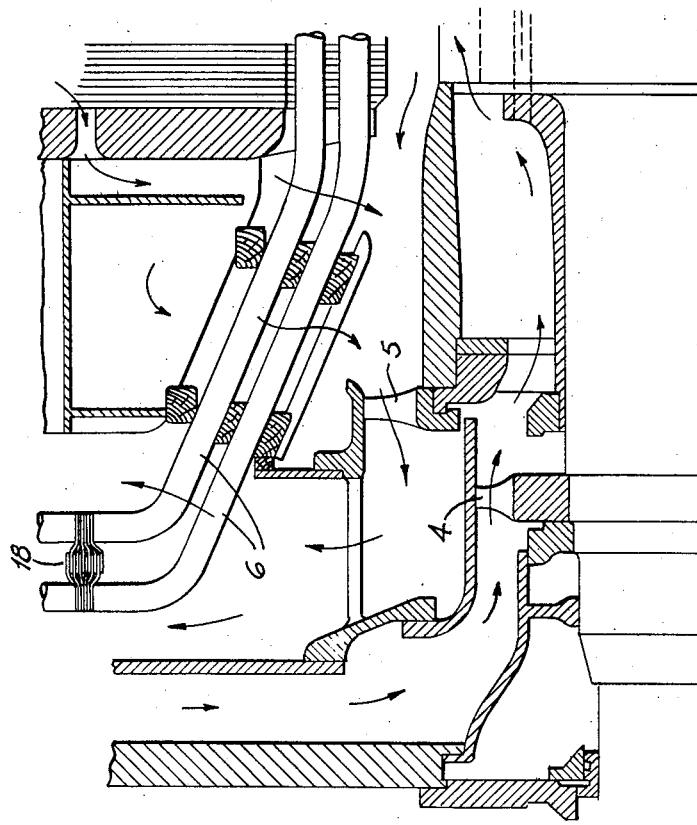
FIG. 3 is a detail view of the end of a stator winding.

In FIG. 1 the reference 1 indicates the rotor and 2 the stator core. 4 and 5 are fans for circulating air or other gas, e.g. hydrogen, around the exterior of the conductors of the rotor and stator respectively. 6 and 6' are the end-windings of the stator winding.

It will be explained subsequently the ends of the conductors are coupled through insulating hose 7, preferably P.T.F.E. to manifolds 8 at each end of the machine and water is fed from the manifold at one end of the machine through the conductors to the manifold at the other end. The outlet water is passed through suitable cooling apparatus and then returned to the other manifold.

Figures 5, 6, 7:
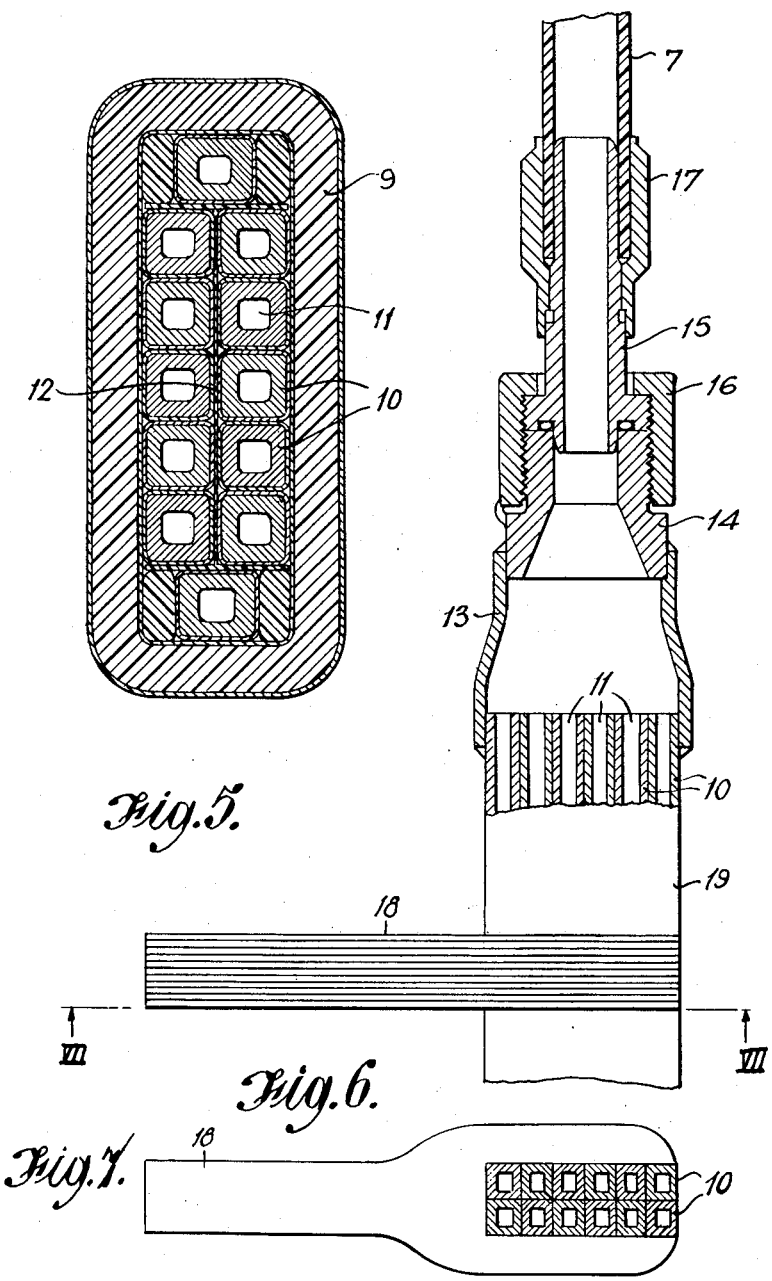
FIG. 5 is an enlarged view of one bar of a slot showing the conductors constructed in accordance with the invention.
FIG. 6 is a detail sectional view showing how the insulating tube is coupled to the conductor passages.
FIG. 7 is a section on the line VII—VII of FIG. 6.

Referring to FIG. 5 which shows details of one of the stator bars, it will be observed that this comprises slot insulation 9 and a number of hollow conductors 10 formed with internal passages 11. The conductors constituting each bar are grouped together and are separated by insulation 12. They are also transposed to reduce eddy currents and the conductors shown at the top and bottom of the slot are in process of transposition.

FIG. 6 shows how the ends of the conductor passages are connected to the insulating P.T.F.E. tubing 7. This is by means of a header 13 secured to a header insert 14 which is secured to an insert 15 by means of a union nut 16. The P.T.F.E. tubing insert is attached to the insert 15 by means of an external sleeve 17 which is swaged over the end of the P.T.F.E. tube. Copper electrical connections 18 are brazed to the end of the conductor bar 19 to form the end electrical connection, i.e. to the other coil side.

As above mentioned, water which is continually recirculated is pumped into the inlet manifold at one end of the machine from whence it is pumped through all the conductors in parallel and discharged from the outlet manifold at the other end of the machine to water coolers and is pumped back to the inlet manifold. The P.T.F.E. hoses 7 are conveniently curved to permit movement in all directions and they are also of sufficient length to give flexibility and to limit the leakage current, through the water, from the live conductors to the manifolds which are normally earthed during operation.

It has been found that this leakage current and associated power loss can be reduced to a negligible minimum for voltages normally employed. Ordinary supply water of low electrical conductivity may be employed or preferably distilled water, for example, as the condensate from steam turbo generator sets.

In addition to the stator winding the connections to the terminals and the terminals themselves, and even the connections between the generator and the transformer, all of which may be difficult to accommodate on machines of large output, can be constructed of hollow conductors and water cooled by the same technique.

What I claim is:

1. An electrical turbo generator comprising a stator and a rotor, a winding to said stator comprising a plurality of hollow conductors having longitudinal passages, said conductors being grouped in an upper bar and a lower bar in each stator slot, water manifolds located at each end of the generator, a tubing connector of polytetrafluoroethylene coupled to each end of each of the group of hollow conductors forming a slot bar and to a water manifold, means for circulating water from the water manifolds through said tubing connectors and in parallel flow through all the conductor passageways of each slot bar, and electrical conductor straps encircling the ends of the conductor bars and forming electrical connections between conductor bars.

2. An electrical turbo generator comprising a stator and a rotor, a polyphase winding to said stator each phase comprising a plurality of hollow conductors having longitudinal passages, said conductors being grouped in an upper bar and a lower bar in each slot, water manifolds located at each end of the generator, there being separate manifolds associated with each phase, a tubing connector of polytetrafluoroethylene coupled to each end of each group of hollow conductors forming a slot bar and to the water manifold for the corresponding phase of each slot bar, means for circulating water from the water manifolds through said tubing connectors and in parallel flow through all the conductor passageways of each slot bar and electrical conductor straps encircling the ends of the conductor bars and forming electrical connections between conductor bars.

References Cited in the file of this patent

UNITED STATES PATENTS

| | | |
|---|---|---|
| 2,695,368 | Kilbourne | Nov. 23, 1954 |
| 2,722,616 | Moses | Nov. 1, 1955 |
| 2,828,428 | Baudry | Mar. 25, 1958 |
| 2,919,359 | Luenberger | Dec. 29, 1959 |